Aug. 24, 1948.  W. E. WINE  2,447,606
ASSEMBLAGE OF REFRIGERATING UNITS
Filed April 4, 1946  2 Sheets-Sheet 1
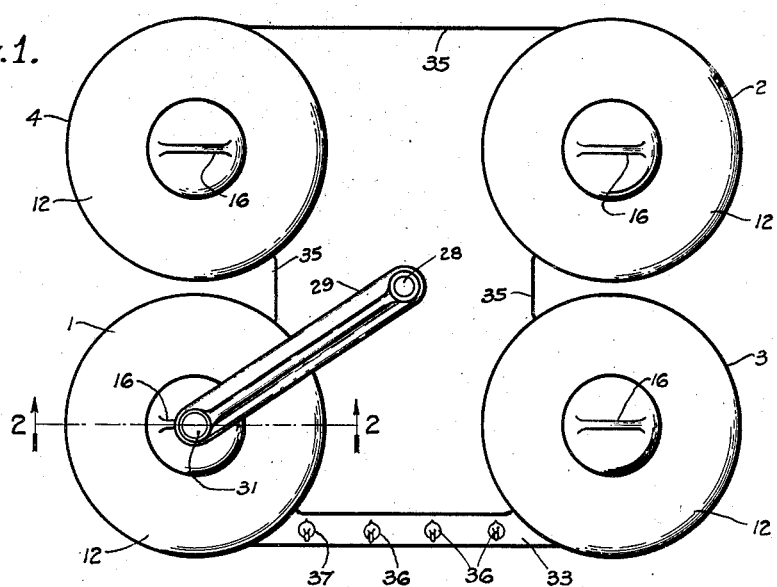
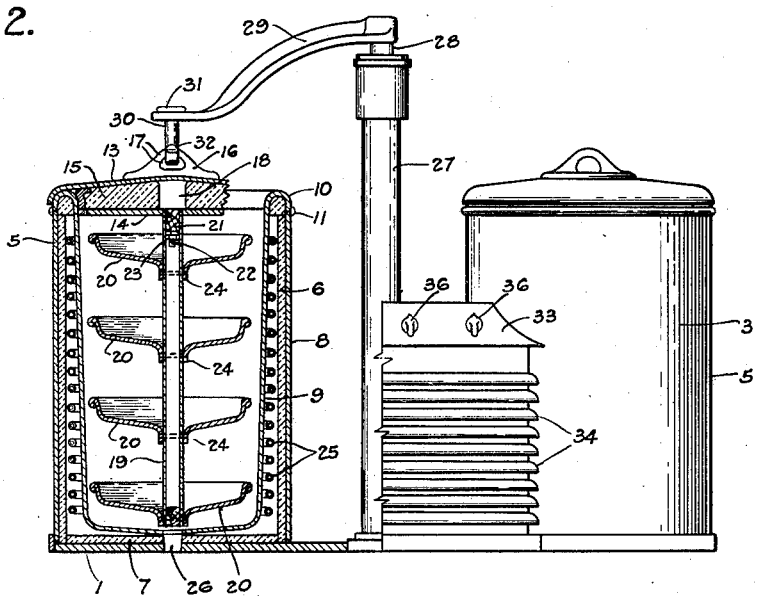
Inventor
William E. Wine
By Ritter, Machlin & Muir
His Attorneys Aug. 24, 1948. W. E. WINE 2,447,606
ASSEMBLAGE OF REFRIGERATING UNITS
Filed April 4, 1946 2 Sheets-Sheet 2

Inventor
William E. Wine
By Ritter, Machlin & Murie
His Attorneys

Patented Aug. 24, 1948

2,447,606

UNITED STATES PATENT OFFICE 2,447,606

ASSEMBLAGE OF REFRIGERATING UNITS

William E. Wine, Parker, Va.

Application April 4, 1946, Serial No. 659,526

7 Claims. (Cl. 62—89)

My invention relates to refrigerating units and assemblies and it has for its principal object the provision of a unit from which all of the food supporting shelves may be removed therefrom in unison.

Another object of the invention is to assemble the refrigerating units with a normally empty insulated container in which the contents of one of the refrigerating units may be temporarily placed without substantial loss of temperature while the unit is being defrosted.

A primary feature of the invention consists in providing a plurality of refrigerating units each of which consists of a container and a set of superimposed connected food supporting shelves arranged therein so that the sets of shelves may be selectively withdrawn from the containers and placed in an insulated container.

Another feature of the invention consists in providing a refrigerating unit involving a container with a plurality of connected vertically spaced food supporting shelves whereby said shelves may be withdrawn from the container as a unit.

Another feature of the invention consists in providing a refrigerating container with a removable top to which a plurality of vertically spaced food supporting shelves are connected so that, when the top is raised, the shelves are correspondingly raised.

A further feature of the invention consists in providing a plurality of refrigerating units adjacent to an insulated unit and in providing mechanical means for withdrawing the contents of any one of the refrigerating units and placing them in the insulated unit to permit defrosting of the refrigerating unit.

Other and more specific features of the invention, residing in advantageous forms, combinations and relations of parts, will hereinafter appear and be pointed out in the claims.

In the drawings,

Figure 1 is a plan view of an assembly of refrigerating units embodying my invention.

Figure 2 is a side view of the assembly showing the refrigerating container on the left in section on approximately the line 2—2 of Fig. 1 and showing the adjacent insulated unit in elevation.

Figure 6:
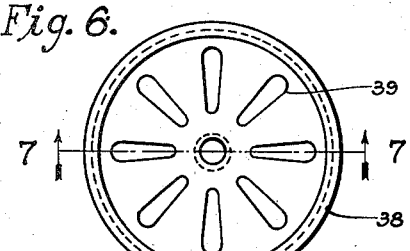
Figure 6 is a plan view of a modified form of one of the food supporting shelves.

Referring more particularly to the drawings, the refrigerating assembly comprises three refrigerating units 1, 2 and 3, respectively, and an insulated unit 4. These four units are preferably arranged in such manner that the longitudinal axis of each intersects the circular path of travel of mechanism to be hereinafter described for selectively raising all of the contents from one refrigerating unit and placing them in the insulated unit.

Each refrigerating unit is composed of a container 5, which is of cylindrical shape, having a side 6 formed of insulating material and a bottom 7 likewise formed of insulating material. The sides 6 are covered on their outer sides by metal 8 of a suitable kind and the inside of each container is also preferably lined with a metal sheet 9 which at its upper portion curves around and closely fits an insulated ring 10 at the upper edge of the side walls. The abutting edges of the upper edge of the outside metal covering 8 and of the down-turned portion of the inside metal covering 9 may be conveniently welded together and the weld may advantageously take the form of a bead 11.

The cover or top 12 of each refrigerating assembly may advantageously consist of top and bottom plates 13 and 14, respectively, between which insulating material 15 is disposed. The periphery of the bottom plates of the covers of the refrigerating units are bent upwardly and secured to the under side of the top plate 13 inwardly of the periphery thereof so that the top plate will overlie the upper ends of the side walls of the container. The upwardly extending portions of the bottom plates 14 of the covers 12 are so disposed as to engage adjacent interior portions of the containers and thereby center them with respect to the containers.

Rigid with the cover of each container is an upwardly extending projection 16 having an aperture 17 for receiving means hereinafter described for raising the cover. Each of the projections 16 may conveniently have a centrally disposed depending portion 18 to which a tubular member 19 having a plurality of vertically spaced food supporting shelves 20 is connected. The upper end of member 19 abuts against the depending portion 16 and is preferably welded thereto. In addition, the tubular member 19 is connected to the top 12 by a screw which passes through a wooden block 21 rigidly secured within the upper portion of the tubular member. The screw, designated 22, has its lower end provided with a nut 23 and its upper end is screw threaded within the depending portion 18 of the container cover.

Each of the food supporting shelves 20 is dished and is centrally apertured to fit around the cooperating tubular member 19, and is formed with a flange 24 around the opening for receiving the tubular member whereby it may be pinned or otherwise secured to it. Although the lower food supporting shelves appear to be of greater diameter than the upper shelves, as viewed in Figure 2, this is due to the circumstance that the inner metal covering 9 converges downwardly so as to permit ready removal of the shelves, it being preferred as shown that all shelves have the same diameter. Refrigerating coils 25 may be advantageously disposed in the space between the insulated side 6 and the lining 9.

The lower end of the tubular member 19 is spaced a short distance above the bottom of each container to permit drainage through an opening 26 in the bottom of the container which may be closed by a plug (not shown).

Located at the center of a circle passing through the vertical centers of each of the refrigerating containers, as well as the insulated container, is an upright member 27 which is preferably of tubular form to receive a vertically movable piston or rod 28 which is adapted to be actuated by any conventional pressure producing means, not shown. It is, of course, revoluble and at its upper end is provided with a radial arm 29 having at its outer end an opening through which a removable hook 30 extends, the upper end of the hook being enlarged, as indicated at 31, to overlappingly engage the upper surface of portions of the arm surrounding the opening through which its shank extends.

Figure 3:
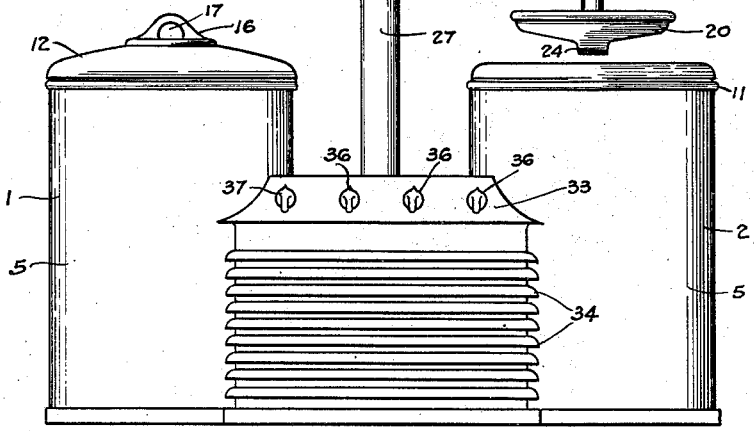
Figure 3 is a side elevational view of the refrigerating assembly showing the food supporting shelves of one refrigerating container supported in an elevated position.

The hook 30 is positioned on the arm so that it can cooperate with the covers of any one of the four containers of the assembly when the arm is suitably rotated. The hooked or lower end 32 of the hook is selectively adapted to extend through the apertures 17 in the upstanding projections 16 of the container covers. Thus, when it is desired to defrost refrigerating container 3, for example, the radial arm 29 is swung around to enable the hook 30 to engage the cover thereof and fluid pressure is then supplied to the lower end of the upright member 27 to raise the rod 28 and, therefore, the cover and the connected food shelves from the container, as shown in Figure 3.

With the food shelves supported in an elevated position, the radial arm is then swung around to position the food shelves above the insulated container 4 from which the cover has been previously manually removed. The fluid pressure may then be slowly released and the supported food shelves lowered into the insulated container and, as this container is substantially the same size as the refrigerating container 3, the cover to which the food shelves are connected will closely fit the top of the insulated container. Thus all of the contents of the refrigerating container 3 are safely disposed within the insulated container 4 and the food carried by the shelves is effectively prevented from spoiling during the defrosting of the refrigerating unit.

In addition to using the fluid pressure raising means for transferring the food shelves of one refrigerating compartment to the insulated unit, it will be appreciated that the means may be employed to merely temporarily raise the food shelves from one of the refrigerating units so as to permit food to be easily removed from any one of the shelves when they are maintained in an elevated position. Thereafter the shelves are lowered into the same unit from which they were withdrawn.

Two of the refrigerating units may be conveniently connected by a metal plate having an upper panel section 33 and a plurality of louvers 34. The louvers, of course, allow for the admission of air into the space between the various units of the assembly where suitable motors may be located for operating compressors for the refrigerating units and, if need be, a compressor to supply the desired fluid pressure to operate the lifting rod 28. The spaces between other units in the assembly may advantageously be closed by suitable plates or the like, as indicated at 35.

Figure 7:
Figure 7 is a detail sectional view taken on line 7—7 of Figure 6.
Figure 5:
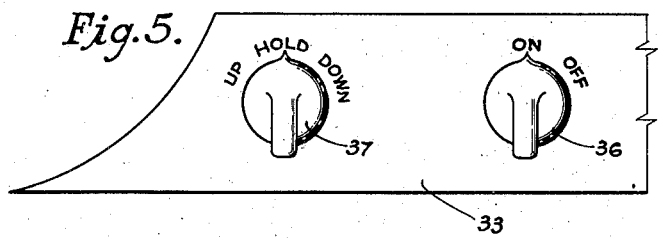
Figure 5 is an enlarged view of one-half of the control panel of the refrigerating assembly.
Figure 4:
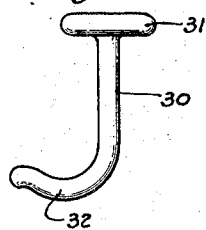
Figure 4 is an enlarged detail view of the hook on the outer end of the arm of the hydraulic lift mechanism.

Located on the panel 33 are four switches, three of which 36 are adapted to be moved into "on" and "off" positions whereby the three refrigerating units may be defrosted. The fourth switch 37 is adapted to control the operation of the lifting rod 28, it being seen in Figure 5 that the switch is capable of assuming three different positions, one being a position designated "up" in which fluid pressure is admitted into the upright member 27 for raising the rod 28, the second being a "hold" position so that the lifting rod 28 is maintained in the desired elevated position, and the third being a "down" position to permit fluid pressure to be released from the upstanding member 27 and the rod 28 to move downwardly. The mechanism adapted to be operated by the four switches is not shown, as it forms no part of the present invention and may be of any conventional form While the dished food supporting shelves 20 shown in the principal figures of the drawings may be imperforate, it may be desired to employ shelves 38, such as indicated in Figures 6 and 7, having a plurality of openings 39 which enable liquid collecting on the shelves to pass downwardly to the bottom of the container.

Various modifications may be made in the embodiment of the invention herein shown and described without departing from the spirit and scope of the invention as defined in the appended claims.

What I claim is:

1. A refrigerating assembly having a plurality of refrigerating units, each of said units consisting of a container and a set of connected vertically spaced food supporting shelves arranged within the container, and means for selectively raising the food supporting shelves from said containers, said means including a rotatable arm selectively cooperable with the set of shelves of any one of said containers and a hydraulic lift for moving said arm vertically to withdraw the selected set of shelves from its container.

2. A refrigerating assembly having a plurality of refrigerating units, each of said units consisting of an open top container, a top cover for the container, and a set of connected vertically spaced food supporting shelves connected to said cover, and means for selectively withdrawing the food supporting shelves from said containers, said means including a rotatable arm selectively cooperable with the cover of any one of said containers and a hydraulic lift for moving said arm vertically to withdraw the food supporting shelves connected to the selected cover.

3. A refrigerating assembly having a refrigerating unit and an insulated unit, said refrigerating unit involving a container and a set of connected vertically spaced food supporting shelves, said insulated unit being normally empty, and means cooperable with said set of food supporting shelves of said refrigerating container to temporarily place the shelves thereof in said insulated unit while the container from which the shelves were withdrawn is being defrosted.

4. A refrigerating assembly having a plurality of refrigerating units and an insulated unit, each of said refrigerating units involving an open top container, a top cover therefor, and a set of connected vertically spaced food supporting shelves connected to said cover, and means selectively cooperable with said covers of said containers to temporarily place the set of shelves connected to the selected cover in said insulated unit while the container from which the shelves were withdrawn is being defrosted.

5. A refrigerating assembly having a plurality of refrigerating units and an insulated unit, each of said refrigerating units consisting of a container and a set of connected vertically spaced food supporting shelves, said insulated unit also consisting of a container and being normally empty, and means for selectively raising the food supporting shelves from said containers, said means including a rotatable arm selectively cooperable with the sets of food supporting shelves of said refrigerating containers and a hydraulic lift for moving said arm vertically to withdraw the selected set of shelves from its container and to place it in said insulated unit while the container from which the shelves were withdrawn is being defrosted.

6. A refrigerating assembly having a plurality of refrigerating units and an insulated unit, said units being respectively open at their upper ends and having a top closing cover, the vertical axes of said units being disposed in a circular path, a set of food supporting shelves rigidly connected to the cover of each refrigerating unit, fluid pressure operating means selectively cooperable with said sets of shelves for temporarily transferring them to said insulated unit, and upright means extending between two of said containers having a plurality of louvers and a panel board adapted to receive switches for controlling the operation of said fluid pressure means and said refrigerating units.

7. A refrigerating assembly having a plurality of refrigerating units and an insulated unit, each of said units being open at the top and being provided with a closing cover, a set of connected vertically spaced food supporting shelves secured to the covers of said refrigerating units, said insulated unit being normally empty, and means for selectively raising the covers and connected shelves of said refrigerating units including pressure operated means having a rotatable arm at its upper end, the outer end of said arm being provided with a hook for selectively engaging the covers of any one of said refrigerating containers to withdraw the shelves of the engaged cover from its container and temporarily place it in the insulated unit.

WILLIAM E. WINE.

REFERENCES CITED

The following references are of record in the file of this patent:

UNITED STATES PATENTS

| Number | Name | Date |
| --- | --- | --- |
| 316,840 | Shaw | Apr. 28, 1885 |
| 2,060,435 | Vincent | Nov. 10, 1936 |
| 2,093,856 | Wales | Sept. 21, 1937 |